United States Patent
Tamano et al.

(10) Patent No.: US 11,886,869 B2
(45) Date of Patent: Jan. 30, 2024

(54) INFORMATION PROCESSING DEVICE AND INFORMATION PROCESSING METHOD FOR UPDATING A PROGRAM BY PARTIALLY RELOCATING THE PROGRAM

(71) Applicant: Panasonic Intellectual Property Management Co., Ltd., Osaka (JP)

(72) Inventors: Hirokazu Tamano, Osaka (JP); Takahiko Kamitsuji, Osaka (JP); Daiki Matsuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 128 days.

(21) Appl. No.: 17/563,833

(22) Filed: Dec. 28, 2021

(65) Prior Publication Data
US 2022/0121440 A1    Apr. 21, 2022

Related U.S. Application Data

(63) Continuation of application No. PCT/JP2021/000757, filed on Jan. 13, 2021.

(30) Foreign Application Priority Data

Jan. 31, 2020 (JP) .................... 2020-014785

(51) Int. Cl.
G06F 9/44    (2018.01)
G06F 8/658   (2018.01)
G06F 11/36   (2006.01)

(52) U.S. Cl.
CPC .......... *G06F 8/658* (2018.02); *G06F 11/3688* (2013.01)

(58) Field of Classification Search
CPC .............................. G06F 8/658; G06F 11/3688
See application file for complete search history.

(56) References Cited

U.S. PATENT DOCUMENTS

| | | | |
|---|---|---|---|
| 10,452,386 B1 * | 10/2019 | Kulchytskyy | G06F 8/654 |
| 2006/0075276 A1 * | 4/2006 | Kataria | G06F 8/65 |
| | | | 714/E11.135 |

(Continued)

FOREIGN PATENT DOCUMENTS

| | | |
|---|---|---|
| JP | 2006-301960 | 11/2006 |
| JP | 2007-312378 | 11/2007 |

(Continued)

OTHER PUBLICATIONS

International Search Report issued in International Pat. Appl. No. PCT/JP2021/000757, dated Apr. 20, 2021, along with an English translation thereof.

(Continued)

*Primary Examiner* — Hang Pan
(74) *Attorney, Agent, or Firm* — GREENBLUM & BERNSTEIN, P.L.C.

(57) ABSTRACT

An information processing device includes a storage in which a first program is stored and an update controller that updates the first program to a second program by use of data obtained from an external device. For each of a plurality of first partial areas obtained by dividing a first storage area storing the first program, the update controller copies a first partial program that is a part of the first program and that is stored in the first storage area to a second storage area and then successively updates the first partial program to a second partial program that is a part of the second program by use of the data. The data is difference information indicating a difference between the first program and the second program. The second storage area has a storage (Continued)

capacity smaller than a storage capacity of the first storage area.

6 Claims, 14 Drawing Sheets

(56) References Cited

U.S. PATENT DOCUMENTS

| | | | |
|---|---|---|---|
| 2006/0206537 A1* | 9/2006 | Chiang | G06F 8/658 |
| 2006/0259207 A1 | 11/2006 | Natsume | |
| 2007/0255764 A1 | 11/2007 | Sonnier et al. | |
| 2018/0349129 A1* | 12/2018 | Ju | G06F 8/654 |
| 2019/0050219 A1 | 2/2019 | Seki | |

FOREIGN PATENT DOCUMENTS

| | | |
|---|---|---|
| JP | 4548601 | 9/2010 |
| JP | 2010-225012 | 10/2010 |
| JP | 4856580 | 1/2012 |
| JP | 2016-033728 | 3/2016 |
| JP | 2017-097576 | 6/2017 |
| JP | 2017-157003 | 9/2017 |
| JP | 2017-199120 | 11/2017 |
| JP | 2018-197993 | 12/2018 |
| JP | 6447469 | 1/2019 |
| JP | 2019-020897 | 2/2019 |
| JP | 2019-074847 | 5/2019 |

OTHER PUBLICATIONS

Japan Office Action issued in Japan Patent Application No. 2020-14785, dated Nov. 29, 2022, together with English translation thereof.

* cited by examiner

INFORMATION PROCESSING DEVICE AND INFORMATION PROCESSING METHOD FOR UPDATING A PROGRAM BY PARTIALLY RELOCATING THE PROGRAM

CROSS REFERENCE TO RELATED APPLICATIONS

This is a continuation application of PCT International Application No. PCT/JP2021/000757 filed on Jan. 13, 2021, designating the United States of America, which is based on and claims priority of Japanese Patent Application No. 2020-014785 filed on Jan. 31, 2020.

FIELD

The present disclosure relates to an information processing device and an information processing method.

BACKGROUND

Patent Literature (PTL) 1 discloses an electronic control device that, when overwriting old information stored in a memory with new information, relocates this old information to another memory different from the original memory.

CITATION LIST

Patent Literature

PTL 1: Japanese Unexamined Patent Application Publication No. 2019-74847

SUMMARY

However, the electronic control device according to PTL 1 can be improved upon.

In view of this, the present disclosure provides an information processing device and so on capable of improving upon the above related art.

An information processing device according to the present disclosure includes: a storage in which a first program is stored; and an update controller that obtains data for updating the first program from an external device and updates the first program to a second program by use of the data obtained, wherein for each of a plurality of first partial areas obtained by dividing a first storage area that is a storage area of the storage in which the first program is stored, the update controller copies a first partial program that is a part of the first program and that is stored in the first partial area to a second storage area different from the first storage area, and then successively updates the first partial program to a second partial program that is a part of the second program by use of partial data of the data, the partial data corresponding to the first partial program, the data is difference information indicating a difference between the first program and the second program, and the second storage area has a storage capacity smaller than a storage capacity of the first storage area.

It is to be noted that general or specific aspects of the above may be implemented in the form of a system, a method, an integrated circuit, a computer program, or a computer readable recording medium, such as a CD-ROM, or through any desired combination of a system, a method, an integrated circuit, a computer program, and a recording medium.

The information processing device and so on according to the present disclosure can reduce the amount of data used in a storage when updating a program.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
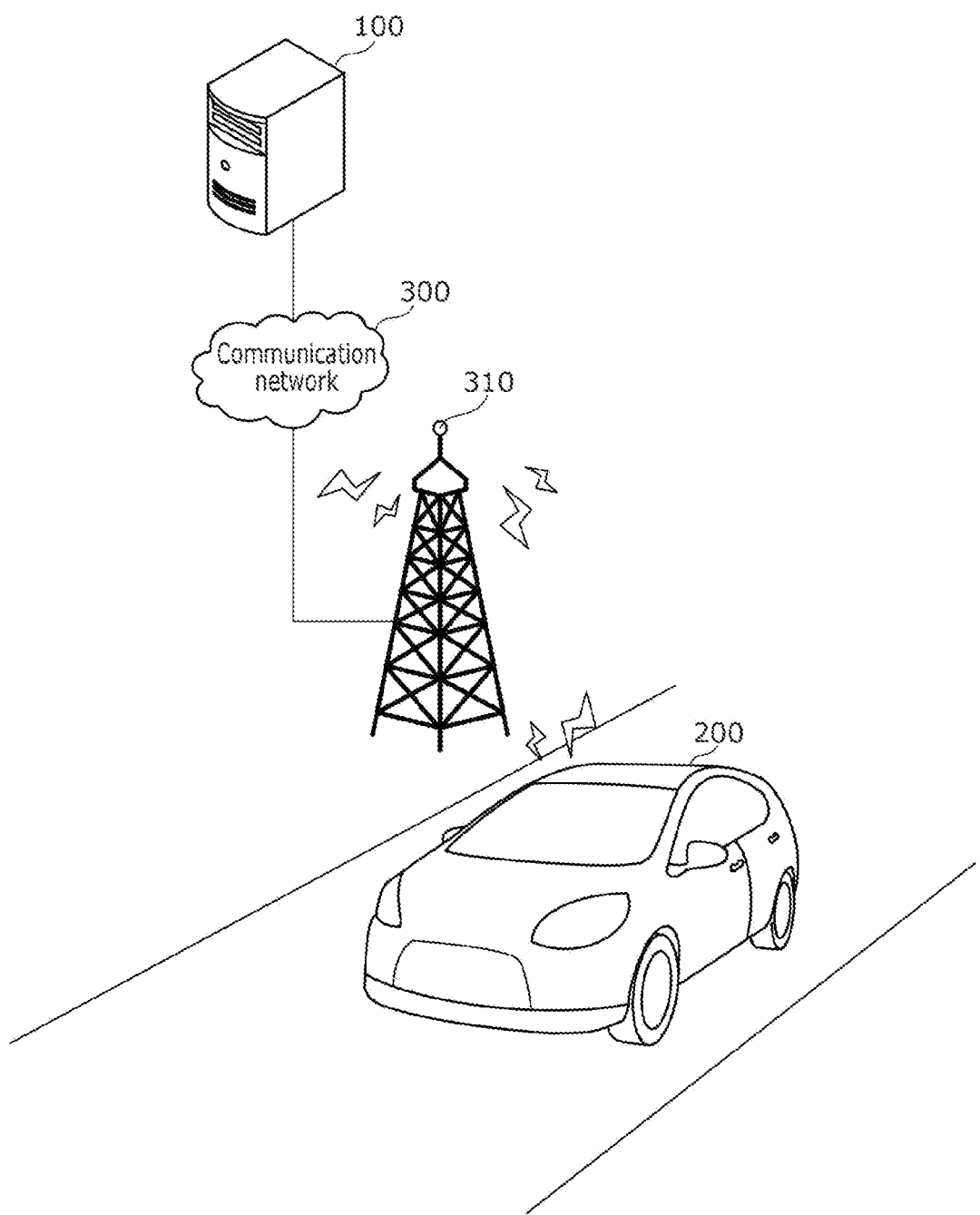
FIG. 1 is a schematic diagram of a system that distributes a program for an update to an automobile according to an embodiment.

DESCRIPTION OF EMBODIMENTS (Underlying Knowledge Forming Basis of the Present Disclosure)

The present inventors have found the following problem with respect to the electronic control device described in Background Art.

The electronic control device disclosed in PTL 1 relocates old information stored in a memory to another memory different from the original memory when overwriting this old information with new information. This technique thus necessitates a separated memory with a storage capacity sufficient to store the old information. Alternatively, if the old information is to be relocated to a difference location within the memory, this memory needs to have an excess storage capacity to store a copy of the old information. As such, the existing technique requires a separate memory or a large-capacity memory.

To address such an issue, the present inventors have come to conceive of an information processing device and an information processing method that can reduce the amount of data used in a storage when updating a program.

An information processing device according to one aspect of the present disclosure includes a storage and an update controller. In the storage, a first program is stored. The update controller obtains data for updating the first program from an external device and updates the first program to a second program by use of the data obtained. For each of a plurality of first partial areas obtained by dividing a first storage area that is a storage area of the storage in which the first program is stored, the update controller copies a first partial program that is a part of the first program and that is stored in the first partial area to a second storage area different from the first storage area, and then successively updates the first partial program to a second partial program that is a part of the second program by use of partial data of the data, the partial data corresponding to the first partial program. The data is difference information indicating a difference between the first program and the second program. The second storage area has a storage capacity smaller than a storage capacity of the first storage area.

According to the above aspect, a first partial program stored in a first partial area to be subjected to an updating process is copied to the second storage area to relocate the first partial program, and then the first partial program stored in this first partial area is updated to a second partial program. Therefore, even in a case where the first partial area is accessed during the updating process, the relocated first partial program can be used instead of the first partial program that is in the middle of the updating process, and the program can be provided to the accessing device. Moreover, the data used for an update is difference information, and the program to be relocated is a first partial program, or a part of the first program. Therefore, the amount of data used in the storage while updating the program can be reduced.

Moreover, the information processing device may further include a first controller and a second controller. The second controller may include the update controller and a provider that provides the first controller with the storage as a virtual storage. The first program may be a program executed when the first controller starts.

According to the above aspect, the first program executed by the first controller is stored in the virtual storage provided by the second controller, and thus the program for the first controller can be updated without involving the first controller. Therefore, the program for the first controller to be updated can be updated without affecting the first controller.

Moreover, when the first controller has accessed the virtual storage while the update controller is updating the first program, (i) when an area accessed by the first controller is a first partial area included in the plurality of first partial areas that has been subjected to an updating process, the provider may provide the first controller with the second partial program stored in the first partial area, (ii) when the area accessed is a first partial area that is being subjected to the updating process, the provider may generate a second partial program updated from a first partial program stored in the second storage area by use of the first partial program and partial data of the data, the partial data corresponding to the first partial program, and provide the first controller with the second partial program generated, or (iii) when the area accessed is a first partial area that has not been subjected to the updating process, the provider may generate a second partial program updated from a first partial program stored in the first storage area by use of the first partial program and partial data of the data, the partial data corresponding to the first partial program, and provide the first controller with the second partial program generated.

According to the above aspect, the process is performed in accordance with the update state of the first partial area that has been accessed, and this makes it possible to provide the first controller with the second program even during the updating process of updating the first program to the second program.

Moreover, the difference information may include items of difference data and correspondence relationship information. The items of difference data may indicate a difference between a plurality of first data units constituting the first program and a plurality of second data units constituting the second program. The correspondence relationship information may be for identifying, for each of the items of difference data, one first data unit, among the plurality of first data units, and one second data unit, among the plurality of second data units, the one first data unit and the one second data unit corresponding to the difference data.

Therefore, a first data unit to which the difference data is to be applied can be identified with ease. Accordingly, the processing load related to the process of generating the second partial program and the processing time related to this generating process can be reduced.

Moreover, when an update has failed while the update controller is updating the first program, for each of the plurality of first partial areas, the update controller may update the first partial program stored in the first partial area to the second partial program, and for each of the plurality of first partial areas obtained by dividing the first storage area storing the second program, the update controller may, after updating the first program to the second program, copy the second partial program that is a part of the second program and that is stored in the first partial area to the second storage area and then update the second partial program to the first partial program that is a part of the first program by use of partial data of the data, the partial data corresponding to the second partial program.

With this process, even when the update from the first program to the second program has failed during the updating process, the state in which the first program is stored in the first storage area can be restored.

Moreover, when an update has failed while the update controller is updating the first program, for each of one or more of the plurality of first partial areas that have been updated and the first partial area where the update has failed, the update controller may copy a second partial program that is a part of the second program and that is stored in the first partial area to the second storage area and then update the second partial program to the first partial program by use of partial data of the data, the partial data corresponding to the second partial program.

With this process, even when the update from the first program to the second program has failed during the updating process, the state in which the first program is stored in the first storage area can be restored.

Moreover, when an update has failed while the update controller is updating the first program, the update controller may make a determination as to whether a first partial area where the update has failed comes before or after a specific first partial area of the plurality of first partial areas in terms of a processing order. When a result of the determination indicates that the first partial area where the update has failed comes before the specific first partial area in terms of the processing order, for each of the plurality of first partial areas that have been updated and the first partial area where the update has failed, the update controller may copy a second partial program that is a part of the second program and that is stored in the first partial area to the second storage area and then update the second partial program to the first partial program by use of partial data of the data, the partial data corresponding to the second partial program. When the result of the determination indicates that the first partial area where the update has failed comes after the specific first partial area in terms of the processing order, for each of the plurality of first partial areas, the update controller may update the first partial program stored in the first partial area to the second partial program, and for each of a plurality of second partial areas obtained by dividing a third storage area storing the second program, the update controller may, after updating the first program to the second program, copy a third partial program that is a part of the second program and that is stored in the second partial area to the second storage area and then update the third partial program to a fourth partial program that is a part of the first program by use of partial data of the data, the partial data corresponding to the third partial program.

With this process, even when the update from the first program to the second program has failed during the updating process, the process can be modified in accordance with the location of the first partial area where the update has failed, and thus the time required for the process can be reduced.

It is to be noted that general or specific aspects of the above may be implemented in the form of a system, a method, an integrated circuit, a computer program, or a computer readable recording medium, such as a CD-ROM, or through any desired combination of a system, a method, an integrated circuit, a computer program, and a recording medium.

Hereinafter, an embodiment will be described in detail with reference to the drawings as appropriate. It is to be noted, however, that any descriptions that are more elaborate than necessary may be omitted. For example, features that are already well known may not be described in detail, or duplicate descriptions of substantially identical configurations may be omitted. This is for keeping the following descriptions from becoming more lengthy than necessary and for facilitating an understanding of a person skilled in the art. It is to be noted that the inventor(s) provide the appended drawings and the following descriptions merely to help a person skilled in the art understand the present disclosure at a sufficient level, and these drawings and descriptions are not intended to limit the subject matter set forth in the claims.

Embodiment

Hereinafter, an embodiment will be described with reference to FIG. 1 to FIG. 13.
[Configuration]
FIG. 1 is a schematic diagram of a system that distributes a program for an update to an automobile according to an embodiment.

Specifically, FIG. 1 illustrates server 100, automobile 200, communication network 300, and base station 310 of a mobile communication network.

Server 100 stores a program (firmware) for an electronic device, such as an electronic control unit (ECU), provided in automobile 200. Server 100 provides such a program to automobile 200 via communication network 300.

Automobile 200 is a mobile body that can connect to and communicate with the mobile communication network via base station 310.

In this manner, FIG. 1 illustrates an example in which a program for updating an ECU in automobile 200 is distributed to automobile 200 over the air (OTA) and thus the program for the ECU is updated. It is to be noted that the method of updating a program for an ECU is not limited to the one that involves OTA. For example, in one alternative technique, an updating device may be connected to automobile 200 via a cable, and a program for an update recorded on a recording medium may be applied to an ECU in automobile 200 by use of the updating device. In other words, each ECU provided in automobile 200 may obtain a program for an update via wireless communication, such as OTA, or via wired communication involving an updating device or the like.

Figure 2:
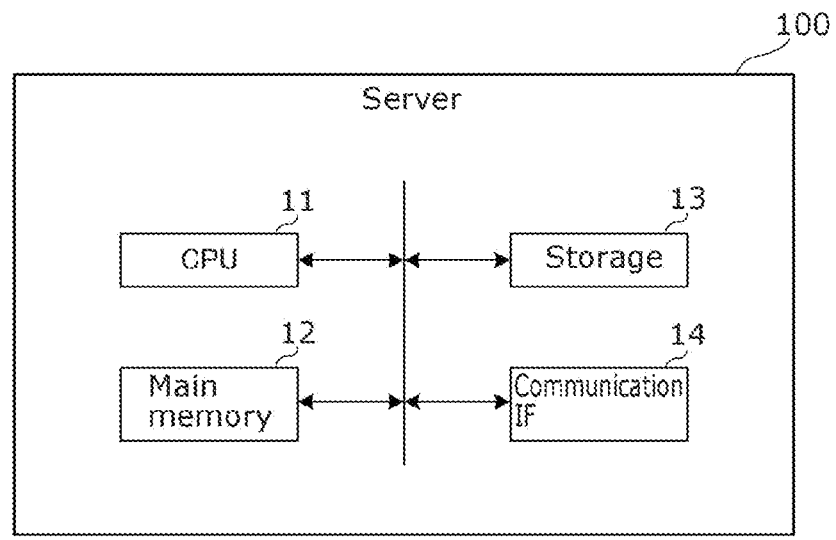
FIG. 2 is a block diagram illustrating an example of a hardware configuration of a server according to an embodiment.

FIG. 2 is a block diagram illustrating an example of a hardware configuration of a server according to an embodiment.

As illustrated in FIG. 2, server 100 includes, in terms of its hardware configuration, central processing unit (CPU) 11, main memory 12, storage 13, and communication interface (IF) 14.

CPU 11 is a processor that executes a control program stored in storage 13 or the like.

Main memory 12 is a volatile storage area to be used as a work area that CPU 11 uses when executing the control program.

Storage 13 is a nonvolatile storage area that holds the control program, contents, and so on.

Communication IF 14 is a communication interface for communicating with a plurality of automobiles 200 via communication network 300. Communication IF 14 is, for example, a wired local area network (LAN) interface. Alternatively, communication IF 14 may be a wireless LAN interface.

Communication IF 14 is not limited to be a LAN interface and may be any type of communication interface that can establish a communication connection to a communication network.

Figure 3:
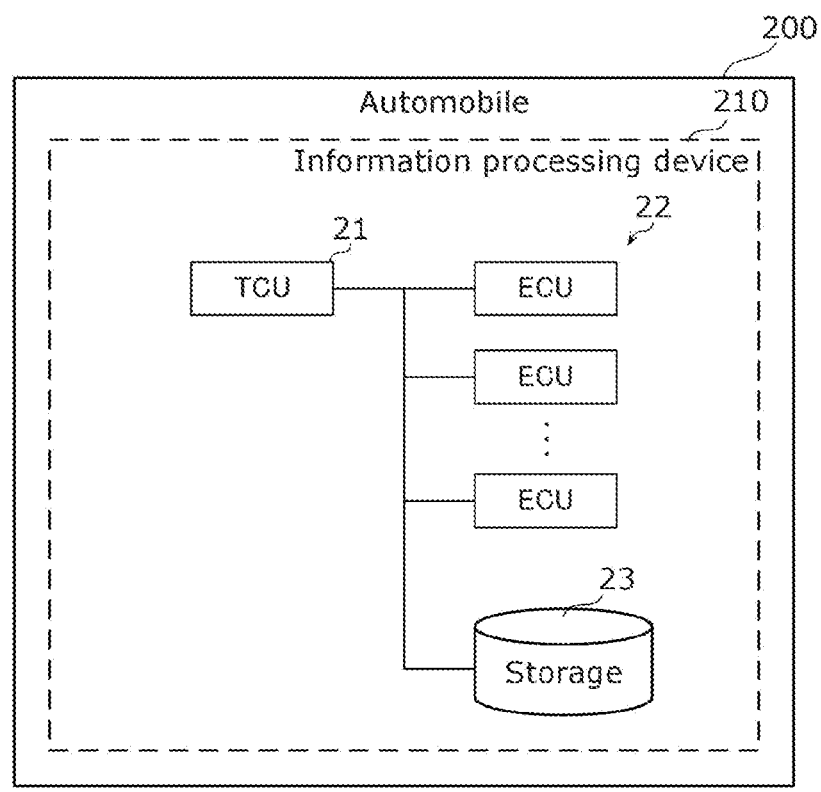
FIG. 3 is a block diagram illustrating an example of a hardware configuration of an information processing device provided in an automobile according to an embodiment.

FIG. 3 is a block diagram illustrating an example of a hardware configuration of information processing device 210 provided in an automobile according to an embodiment.

As illustrated in FIG. 3, information processing device 210 includes, in terms of its hardware configuration, telematics control unit (TCU) 21 and n ECUs 22. It is to be noted that information processing device 210 does not have to include all the hardware components illustrated in FIG. 3. For example, information processing device 210 does not have to include TCU 21.

TCU 21 is a communication unit via which automobile 200 communicates wirelessly with communication network 300. TCU 21 includes a cellular module that conforms to a mobile communication network standard.

N ECUs 22 are control circuits that control various devices, including an engine, a motor, a meter, a transmission, a brake, a steering, a power window, and an air conditioner, provided in automobile 200. For example, n ECUs 22 are provided for the respective devices, including those mentioned above. Although not illustrated, n ECUs 22 may each include a storage (a nonvolatile storage area) in which a program to be executed by corresponding ECU 22 is stored. Such a storage is, for example, a nonvolatile memory.

Storage 23 is a nonvolatile storage area that holds a control program and so on. Storage 23 is implemented by, for example but not limited to, a hard disk drive (HDD) or a solid-state drive (SSD).

Next, a functional configuration of information processing device 210 of automobile 200 will be described with reference to FIG. 4.

Figure 4:
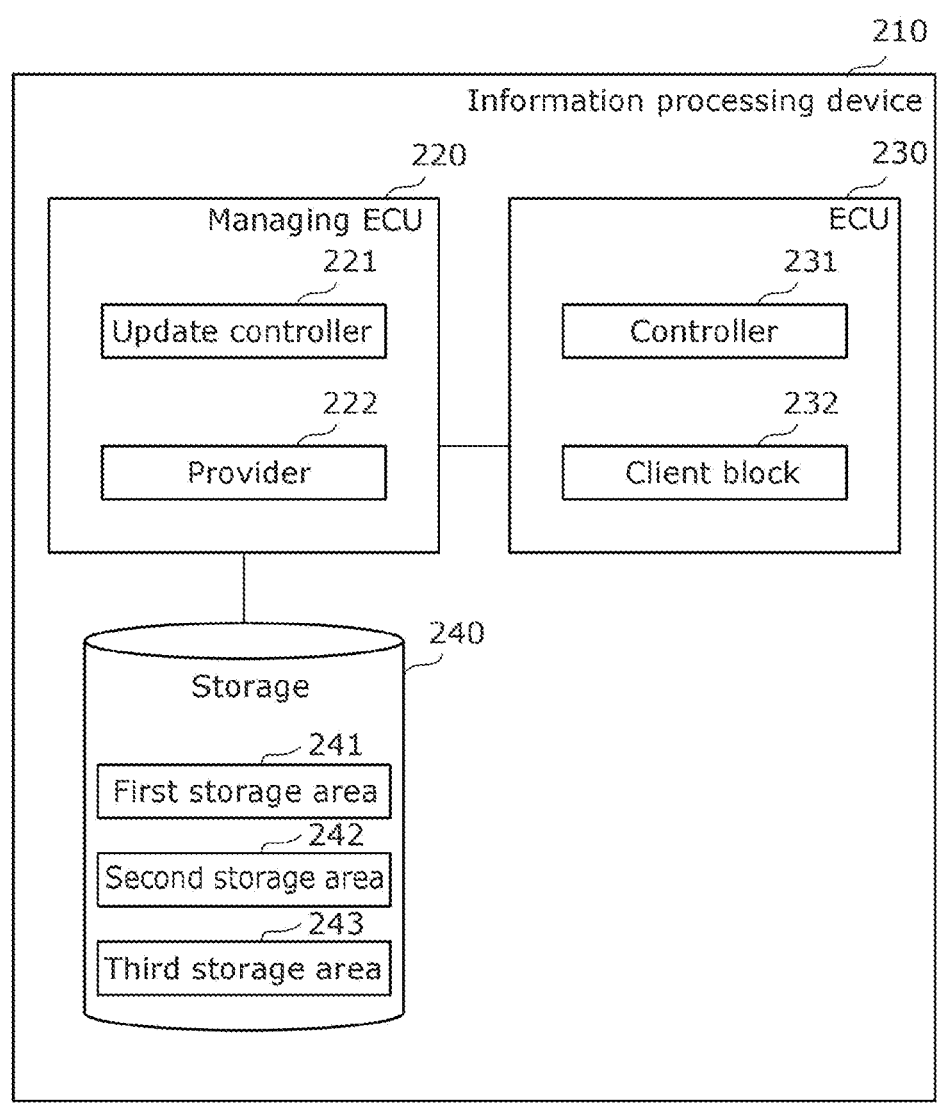
FIG. 4 is a block diagram illustrating an example of a functional configuration of an information processing device according to an embodiment.

FIG. 4 is a block diagram illustrating an example of a functional configuration of information processing device 210 according to an embodiment.

Information processing device 210 includes managing ECU 220, ECU 230, and storage 240.

Managing ECU 220 manages an update of a program to be executed by ECU 230. Managing ECU 220 provides ECU 230 with storage 240 that functions as a virtual storage. Managing ECU 220 is implemented by, for example, at least one ECU among n ECUs 22. Managing ECU 220 may include TCU 21. Managing ECU 220 is an example of a second controller.

Storage 240 is provided to ECU 230 as a virtual storage via managing ECU 220. Storage 240 includes first storage area 241, second storage area 242, and third storage area 243. In first storage area 241, a first program that ECU 230 executes when starting is stored. The first program is a program being used presently by ECU 230. In this example, a program being used presently by ECU 230 is a program set to be used when ECU 230 starts and does not necessarily refer to a program that is being executed by ECU 230.

Second storage area 242 is a storage area different from first storage area 241. Second storage area 242 is a storage area having a storage capacity smaller than the storage capacity of first storage area 241. Second storage area 242 is used when the first program is updated, and a first partial program that is a part of the first program is stored temporarily in second storage area 242.

Third storage area 243 is a storage area in which data for an update to be used to update the first program is stored temporarily. Third storage area 243 is a storage area different from both first storage area 241 and second storage area 242. Third storage area 243 is a storage area having a storage capacity smaller than the storage capacity of first storage area 241. The total storage capacity including the storage capacity of second storage area 242 and the storage capacity of third storage area 243 is smaller than the storage capacity of first storage area 241.

Storage 240 is implemented by storage 23.

ECU 230 accesses the first storage area storing the first program in storage 240 and executes the first program. ECU 230 implements its own functions by executing the first program when starting. ECU 230 is implemented by, for example, at least one ECU among n ECUs 22, and this at least one ECU is different from ECU 22 that implements managing ECU 220. ECU 230 is an example of a first controller.

Now, some specific functions of managing ECU 220 and ECU 230 will be described.

Managing ECU 220 includes, specifically, update controller 221 and provider 222.

Update controller 221 controls an updating process of updating the first program to be executed by ECU 230 to a new second program. Specifically, update controller 221 obtains data for an update for updating the first program from an external device and updates the first program to the new second program by use of the obtained data for an update. Update controller 221 stores the obtained data for an update into third storage area 243. Details of the control performed in the updating process by update controller 221 will be described later. In this example, the external device is, for example, server 100 or an updating device.

Provider 222 is a processor that provides virtual storage 260 to ECU 230 by use of storage 23 implementing storage 240. Provider 222 is accessed by ECU 230 having a virtual client function and provides ECU 230 with a virtual storage storing the first program stored in a real storage area of storage 23. Moreover, in a case where update controller 221 is executing an updating process of updating the first program to the second program, provider 222 provides ECU 230 with a virtual storage storing a part of the first program stored in the real storage area of storage 23 as well as the second program by use of the data for an update. Details of the providing process performed by provider 222 will be described later.

ECU 230 includes, specifically, controller 231 and client block 232.

Controller 231 is a processor that implements the functions of ECU 230 by executing the first program or the second program stored in the virtual storage provided by managing ECU 220. Specifically, controller 231 controls client block 232 to access the virtual storage provided by managing ECU 220 and executes the first program or the second program stored in the virtual storage.

Client block 232 is a processor that exchanges information with provider 222 of managing ECU 220 and is thus provided, by provider 222, with the first program or the second program stored in storage 240 that functions as the virtual storage.

Figure 5:
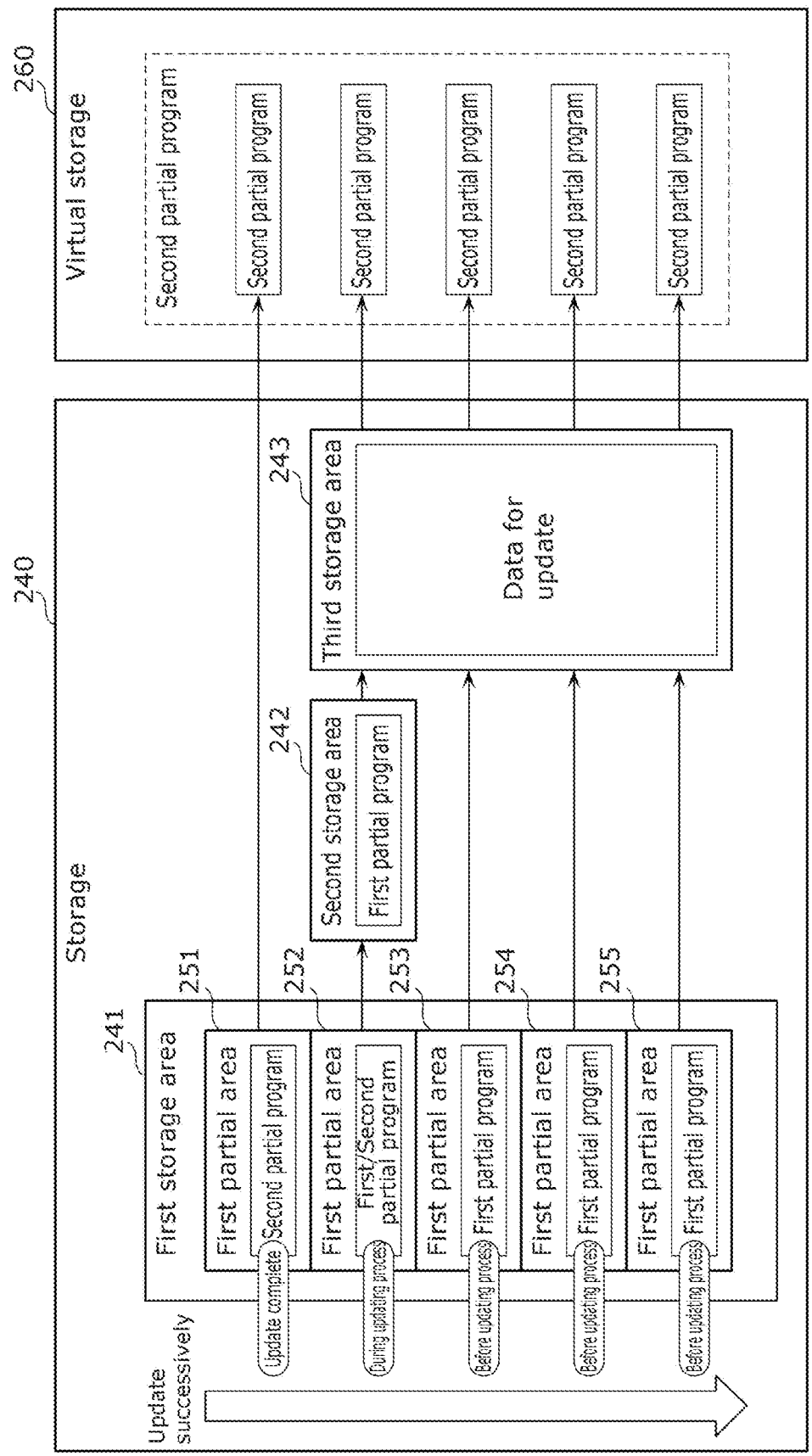
FIG. 5 is a diagram for describing control in an updating process and for describing a providing process according to an embodiment.

Next, the control in the updating process and the details of the providing process will be described with reference to FIG. 5. FIG. 5 is a diagram for describing the control in an updating process and for describing a providing process. Here, FIG. 5 is a diagram illustrating a state held during the updating process.

First, the control in the updating process performed by update controller 221 will be described.

First storage area 241 storing the first program is divided into a plurality of first partial areas 251 to 255, and for each of the plurality of first partial areas 251 to 255, update controller 221, by use of the obtained data for an update, updates a first partial program stored in the corresponding first partial area to a second partial program that is a part of a new second program. Specifically, update controller 221 selects, one by one in a predetermined order, a first partial area to be processed from the plurality of first partial areas 251 to 255. Then, update controller 221 copies the first partial program stored in the selected first partial area to be processed to second storage area 242. Thereafter, update controller 221 generates a second partial program by applying the data for an update to the first partial program stored in the first partial area to be processed and overwrites the first partial program in the first partial area to be processed with the generated second partial program. Thus, update controller 221 updates the first partial program to the second partial program. In this example, the predetermined order may be the order in which the first partial areas are accessed in storage 23, for example.

In this example, the plurality of first partial areas 251 to 255 may be storage areas located continuously in the real storage area of storage 23, or these first partial areas may be storage areas located with a predetermined storage area gap provided between adjacent first partial areas. In a case where the first partial areas are located with a predetermined storage area gap provided between adjacent first partial areas, free space or data indicating free space may be stored in the predetermined storage area between adjacent first partial areas. The predetermined storage area may store the second partial program that could not be stored in first partial area 251 when the data amount of the updated second partial program exceeds the storage capacity of first partial area 251. The predetermined storage area used in this case may be a storage area located adjacent to first partial area 251. In this example, the above may be applied in a case where storage 23 is implemented by, for example, an HDD, or a recording medium that is accessed sequentially. This does not necessarily apply if storage 23 is implemented by a nonvolatile memory, such as an SSD, that is accessed randomly.

In the above example, the plurality of first partial areas include five areas. The plurality of first partial areas are not limited to five areas and may include less than five areas or more than five areas.

The first partial programs are partial programs of the first program and are stored in respective first partial areas 251 to 255. Each first partial program is a code, among the codes constituting the first program, that is stored in the corresponding first partial area. The first program is stored across (over) the plurality of first partial areas 251 to 255 constituting first storage area 241. The first program does not function unless all of the plurality of first partial programs constituting the first program are present.

Each second partial program is a part of the second program and is a partial program generated as the data for an update is applied to each of the plurality of first partial programs. Each second partial program is a code, among the codes constituting the second program, that is generated as the first partial program corresponding to the given second partial program is updated by use of the data for an update. Upon update controller 221 completing the update, all of the plurality of first partial programs stored in respective first partial areas 251 to 255 are overwritten with the respective second partial programs. Therefore, the plurality of second partial programs become stored in respective first partial areas 251 to 255. The second program does not function unless all of the plurality of second partial programs constituting the second program are present.

Figure 6:
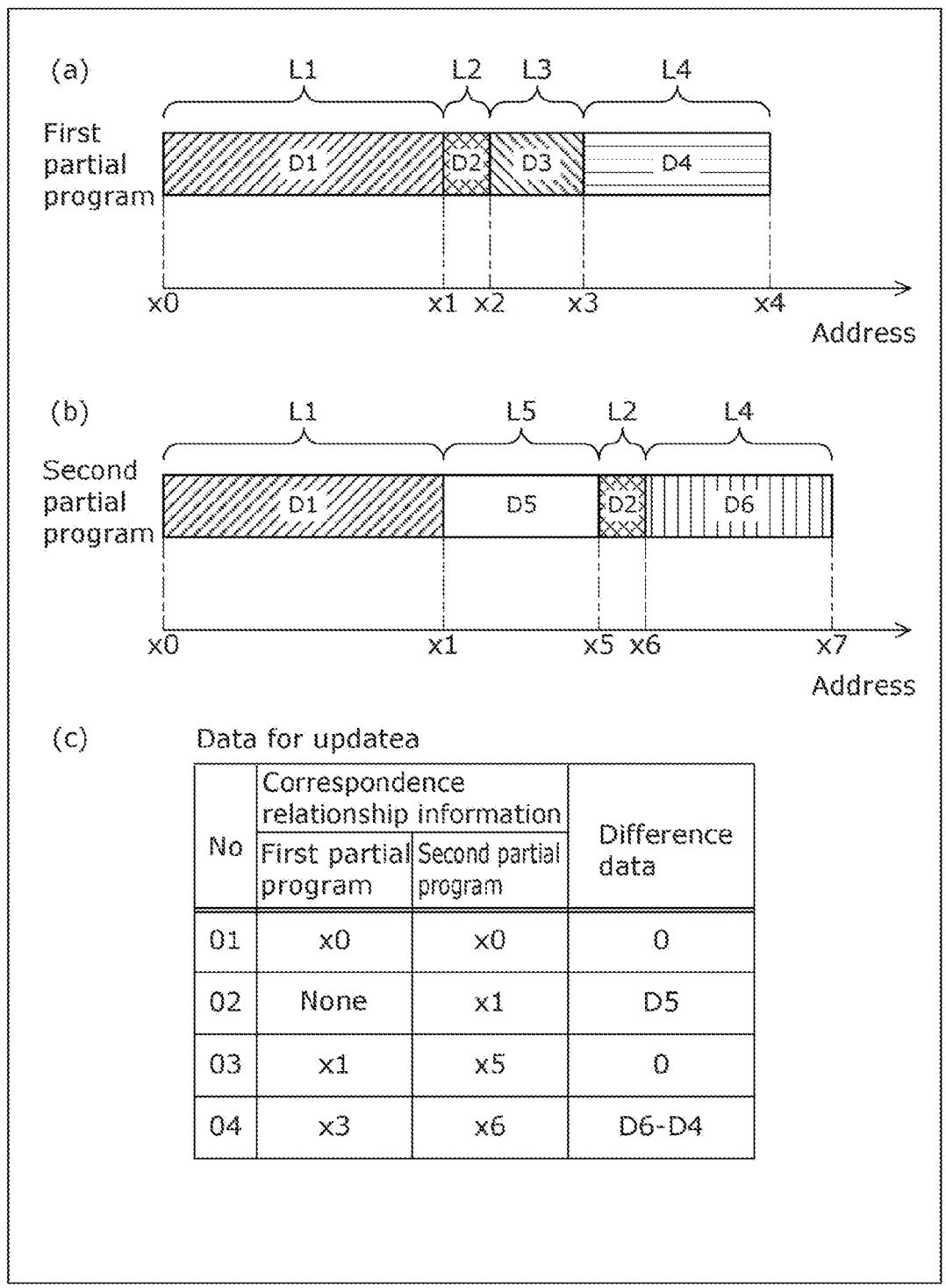
FIG. 6 is a diagram for describing an example of some details of an updating process according to an embodiment.

Next, the details of the updating process will be described with reference to FIG. 6. FIG. 6 is a diagram for describing an example of some details of an updating process according to an embodiment. In FIG. 6, (a) is a diagram illustrating a relationship between a plurality of first data units D1 to D4 constituting the first partial program and the address (the location) of each first data unit in the data constituting the first partial program. In FIG. 6, (b) is a diagram illustrating a relationship between a plurality of second data units D1, D2, D5, and D6 constituting the second partial program and the address (the location) of each second data unit in the data constituting the second partial program.

In this example, the address in the program may be indicated, for example, by a relative value (an offset value) from a predetermined reference address (for example, the starting address of the program, an absolute value). For example, address x1 of first data unit D2 in the first partial program may be calculated based on reference address x0 and data length L1 of first data unit D1 stored preceding first data unit D2. In other words, address x1 may be calculated by adding data length L1 to reference address x0.

In FIG. 6, (c) is a diagram illustrating a structure of data for an update. The data for an update includes items of difference data and correspondence relationship information. The data for an update may further include items of difference data and the numbers (the sequence numbers) for identify their correspondence relationship information. The items of difference data are data indicating the differences between the plurality of first data units D1 to D4 constituting the first partial program and the plurality of second data units D1, D2, D5, and D6 constituting the second partial program. The correspondence relationship information includes the address, in the first partial program, of the first data unit corresponding to each of the items of difference data and the address, in the second partial program, of the second data unit corresponding to each of the items of difference data. In other words, the correspondence relationship information is information for identifying the first data unit and the second data unit corresponding to each piece of the difference data.

In (c) in FIG. 6, the first data unit of the first partial program and the second data unit of the second partial program that are in the correspondence relationship are illustrated.

The correspondence relationship information with number 01 indicates that first data unit D1 of the first partial program that is located at address x0 in the data and second data unit D1 of the second partial program that is located at address x0 in the data are in the correspondence relationship. Moreover, the difference data with number 01 is 0, and this indicates that first data unit D1 and second data unit D1 are the same data unit. In other words, update controller 221 can generate second data unit D1 by adding 0 as the difference data to first data unit D1 of the first partial program that is located at address x0 in the data.

The correspondence relationship information with number 02 indicates that there is no address corresponding to the first partial program and that the address corresponding to the second partial program is x1. This indicates that, in the second partial program, second data unit D5 indicated by the difference data is inserted at address x1 after preceding second data unit D1 with number 01. In other words, update controller 221 identifies address x1 by adding data length L1 of previously generated second data unit D1 to address x0 of previously generated second data unit D1 and inserts, at identified address x1, data unit D5 indicated by the difference data with number 02. With this configuration, update controller 221 can generate second data unit D5 of the second partial program at address x1 in the data.

The correspondence relationship information with number 04 indicates that first data unit D4 of the first partial program that is located at address x3 in the data and second data unit D6 of the second partial program that is located at address x6 in the data are in the correspondence relationship. Moreover, the difference data with number 04 is D6−D4, which is not 0, and this indicates that first data unit D4 and second data unit D6 are different data units. In other words, update controller 221 identifies address x6 by adding data length L2 of previously generated second data unit D2 to address x5 of previously generated second data unit D2. Update controller 221 generates second data unit D6 by adding first data unit D4 to D6−D4, which is the difference data with number 04, and places generated second data unit D6 to identified address x6.

Moreover, the correspondence relationship information with number 04 indicates address x3 of the first partial program in the data, and address x2 preceding address x3 by one is skipped in the order in which address x0 to address x3 of first data units D1 to D4 of the first partial program are arranged. This indicates that first data unit D3 at address x3 is to be deleted. Therefore, update controller 221 deletes first data unit D3 of the first partial program. In this example, update controller 221 may store deleted first data unit D3 into third storage area 243.

The description of the process for the correspondence relationship information with number 03 will be omitted.

In this manner, update controller 221 generates a second partial program by applying data for an update to a first partial program and updates the first partial program stored in the first partial area to the second partial program by overwriting the first partial program with the generated second partial program.

The data amount of the difference data is likely to be small since the first partial program and the second partial program are highly likely to be similar to each other. This makes it possible to reduce the data amount of the data for an update to the data amount smaller than that of the second partial program.

In this example, the difference between the first partial program and the second partial program can be obtained by use of a binary differential algorithm. In this case, the correspondence relationship information is not limited to the information indicated in (c) in FIG. 6 and may be calculated based on the data indicating the processing content (an addition, an insertion, a deletion) of the difference data and the data length of the data to be processed according to the processing content. This makes it possible to identify the address of the first data unit and the address of the second data unit indicated in (c) in FIG. 6.

FIG. 6 illustrates a case where the first partial program and the second partial program are used. Alternatively, the first partial program may be replaced by the first program, and the second partial program may be replaced by the second program; thus, the first program and the second program can be described in a similar manner.

Next, with reference to FIG. 5, the providing process performed by provider 222 will be described.

When ECU 230 has accessed virtual storage 260 while update controller 221 is updating the first program, provider 222 provides a new second program to ECU 230 by performing any one of the three processes described below in accordance with the update state of first partial areas 251 to 255 having been accessed. In other words, update controller 221 performs different processes in accordance with the three update states (after the updating process, during the updating process, before the updating process).

(1) When the area accessed is first partial area 251 that has been subjected to the updating process (the update has been completed), provider 222 provides ECU 230 with the second partial program stored in this first partial area 251. In this case, since the program stored in accessed first partial area 251 has already been updated to the second partial program, provider 222 provides ECU 230 with the updated second partial program stored in first partial area 251.

(2) When the area accessed is first partial area 252 that is being subjected to the updating process, provider 222 generates a second partial program updated from the first partial program by use of the first partial program stored in second storage area 242 and the partial data, of the data for an update, that corresponds to the stated first partial program. Then, provider 222 provides ECU 230 with the generated second partial program. In this case, since the program stored in accessed first partial area 252 is presently being subjected to the updating process, provider 222 generates the second partial program by applying the partial data, of the data for an update stored in third storage area 243, that corresponds to the first partial program to this first partial program that has been relocated to second storage area 242 during the updating process. In other words, in the above case, provider 222 generates a second partial program at each instance of access and provides ECU 230 with the generated second partial program.

(3) When the area accessed is any one of first partial areas 253 to 255 that have not been subjected to the updating process, provider 222 generates a second partial program updated from the first partial program by use of the first partial program stored in the accessed first partial area and the partial data, of the data for an update, that corresponds to the stated first partial program. Then, provider 222 provides ECU 230 with the generated second partial program. In this case, since the program stored in accessed first partial area 251 has not been subjected to the updating process, provider 222 generates the second partial program by applying the partial data, of the data for an update stored in third storage area 243, that corresponds to the first partial program to this first partial program stored in the accessed first partial area. In other words, in the above case, provider 222 generates the second partial program at each instance of access and provides ECU 230 with the generated second partial program.

In this manner, provider 222 performs a process corresponding to the update state of the accessed first partial area. Therefore, provider 222 can provide ECU 230 with an updated second program even during the process of updating the first program to the second program.

In this example, provider 222 generates the second partial program at each instance of access in (2) and (3) described above, but this is not a limiting example. For example, provider 222 may generate a second partial program at a first instance of access and temporarily hold the generated second partial program in storage 240. Then, provider 222 may provide ECU 230 with the temporarily held second partial program at a second or subsequent instance of access. In this case, the processing load can be reduced since provider 222 needs to generate the second partial program only once.

In this example, provider 222 may determine whether to temporarily hold the second partial program in storage 240 based on the frequency of access by ECU 230, for example. In this case, provider 222 may temporarily hold, in storage 240, the number of times each first partial program is accessed by ECU 230. Then, provider 222 may temporarily hold the generated second partial program in storage 240 if the number of times each first partial program is accessed has reached a preset number or may refrain from temporarily holding the generated second partial program in storage 240 if the number of times each first partial program is accessed by ECU 230 falls below the preset number.

Figure 7:
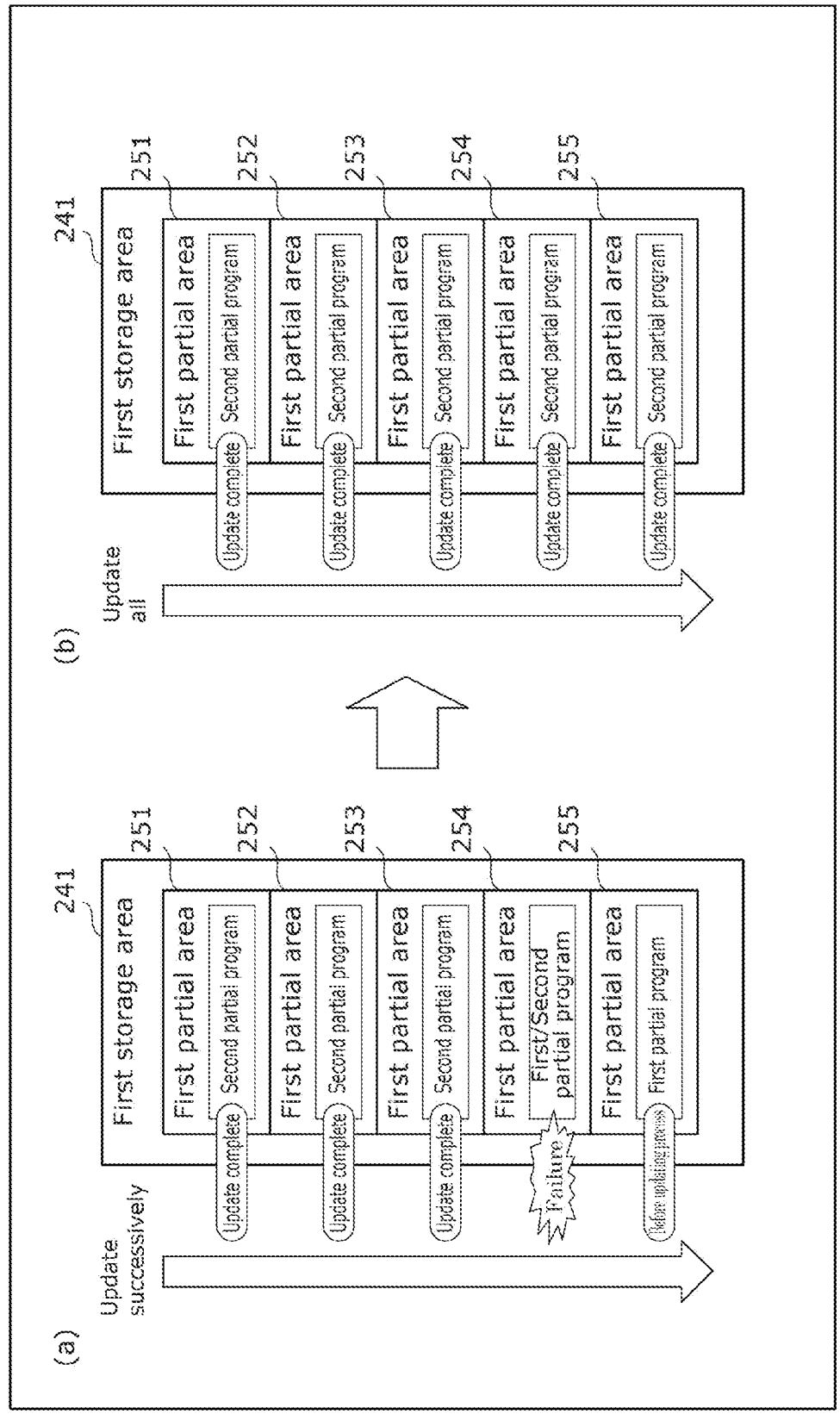
FIG. 7 is a diagram for describing a first example of a process to be performed when an updating process according to an embodiment has failed.

Next, with reference to FIG. 7, a first example of a process (a rollback process) of restoring to a pre-update state when the updating process has failed during the updating process performed by update controller 221 to update the first program to the second program will be described. FIG. 7 is a diagram for describing a first example of a process to be performed when an updating process has failed. In this example, update controller 221 may hold, in storage 240, the update state of each of the plurality of first partial areas 251 to 255. The update state includes three states: after the updating process (the update has been completed), during the update, and before the updating process (the process has not been performed).

When update controller 221 has failed to update the first partial program in first partial area 254 as illustrated in (a) in FIG. 7, update controller 221 updates the first partial program stored in a given first partial area to the second partial program for each of the plurality of first partial areas 251 to 255 as illustrated in (b) in FIG. 7. In other words, even when update controller 221 has failed to update one first partial program, update controller 221 continues to update the first partial programs stored in the first partial areas that have not been processed to the second partial programs. How update controller 221 updates the first partial program is as described with reference to FIG. 5 and FIG. 6.

Then, after updating the first program to the second program, update controller 221 updates the second partial program stored in a given first partial area to the first partial program that is a part of the original first program by use of the data for an update stored in third storage area 243 for each of the plurality of first partial areas 251 to 255 obtained by dividing first storage area 241 storing the second program. Update controller 221 performs this process in a manner similar to the manner in which update controller 221 updates the first program to the second program. In other words, this process can be described with the first program read as the second program, with the second program read as the first program, with the first partial program read as the second partial program, and with the second partial program read as the first partial program in the description of the control in the updating process performed by update controller 221. In this case, the same applies to the description of the providing process performed by provider 222.

In the above, update controller 221 updates the second partial program by use of the data for an update stored in third storage area 243 when updating the second partial program to the original first partial program, but this is not a limiting example. For example, in a case where the data for an update stored in third storage area 243 is data that cannot be applied to the updating process of restoring the second partial program to the original first partial program or where the amount of processing required in the updating process of restoring the second partial program to the original first partial program is greater than a predetermined amount of processing (for example, the amount or processing required for the updating process of updating the first partial program to the second partial program), update controller 221 may perform the updating process of restoring the second partial program to the original first partial program by use of new data for an update. In this case, update controller 221 obtains, from an external device, new data for an update for the updating process of restoring the second partial program to the original first partial program.

Figure 8:
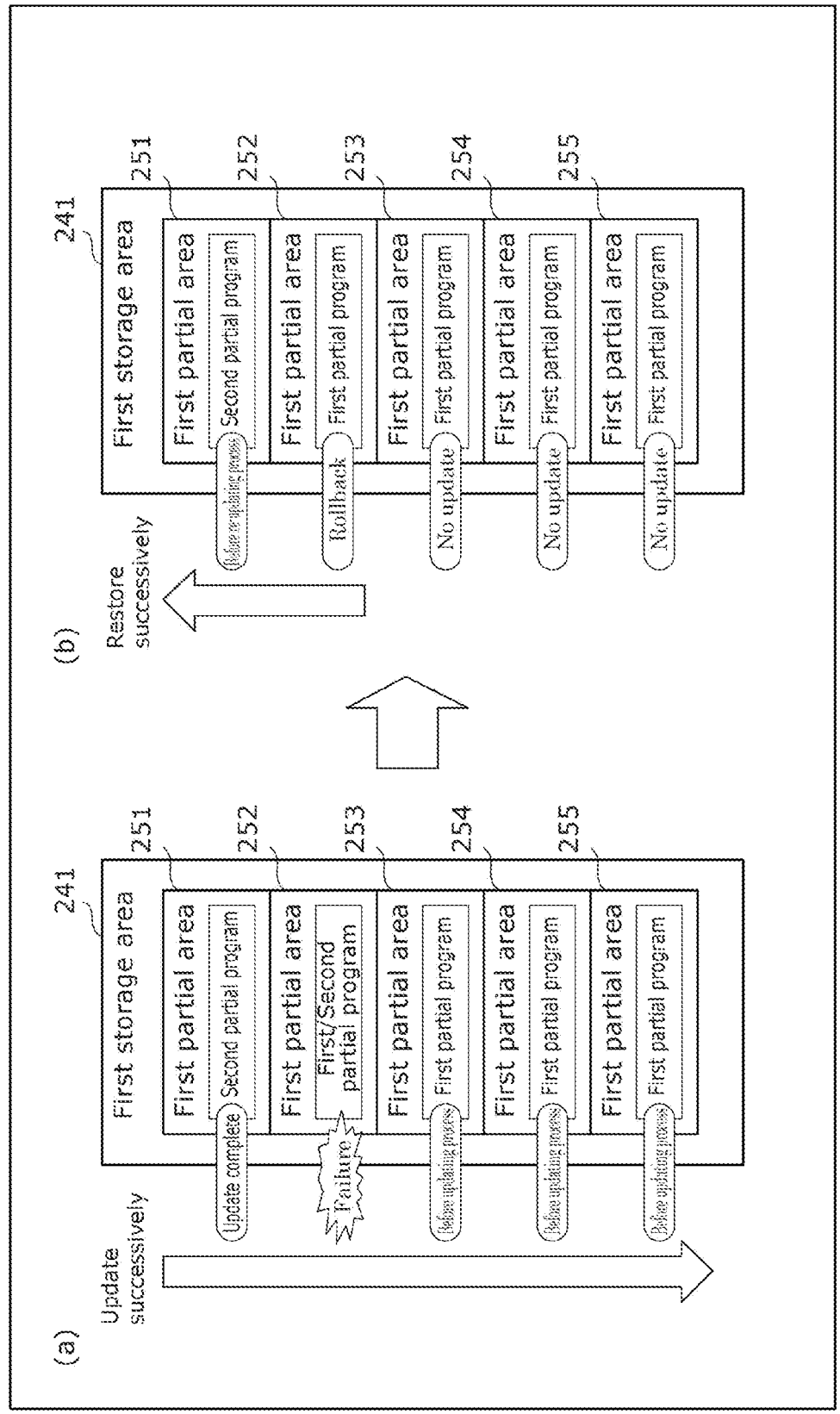
FIG. 8 is a diagram for describing a second example of a process to be performed when an updating process according to an embodiment has failed.

Next, with reference to FIG. 8, a second example of a process (a rollback process) of restoring to a pre-update state when the updating process has failed during the updating process performed by update controller 221 to update the first program to the second program will be described. FIG. 8 is a diagram for describing a second example of a process to be performed when an updating process has failed.

When update controller 221 has failed to update the first partial program in first partial area 252 as illustrated in (a) in FIG. 8, update controller 221 updates the second partial program to the first partial program by use of the partial data, of the data for an update, that corresponds to this second partial program after copying the second partial program stored in the first partial area where the update has failed to second storage area 242 for each of one or more first partial areas 251 that have been updated and first partial area 252 where the update has failed. Update controller 221 performs this process in a manner similar to the manner in which update controller 221 updates the first program to the second program. In this case, the same applies to the description of the providing process performed by provider 222.

Next, a third example of a process (a rollback process) of restoring to a pre-update state when the updating process has failed during the updating process performed by update controller 221 to update the first program to the second program will be described. The third example is an example in which the process of the first example and the process of the second example are switched depending on the location of the first partial area where the update has failed.

Specifically, when the update has failed while the first program is being updated, update controller 221 determines whether the first partial area where the update has failed comes before or after specific first partial area 253, among the plurality of first partial areas 251 to 255, in terms of their processing order. Then, if the result of the determination indicates that the first partial area where the update has failed comes before specific first partial area 253 in terms of the processing order, update controller 221 performs the process of the second example described with reference to FIG. 8. Meanwhile, if the result of the determination indicates that the first partial area where the update has failed comes after specific first partial area 253 in terms of the processing order, update controller 221 performs the process of the first example described with reference to FIG. 7.

In this example, if the result of the determination indicates that the first partial area where the update has failed is specific first partial area 253 in terms of the processing order, update controller 221 may perform the process of the first example or the process of the second example. In this case, whether update controller 221 performs the process of the first example or the process of the second example may be determined in advance, and update controller 221 performs the predetermined one of the process of the first example and the process of the second example. In the above example, the specific first partial area is first partial area 253 among the plurality of first partial areas 251 to 255, but the specific first partial area is not limited to first partial area 253. The specific first partial area may be any predetermined first partial area among the plurality of first partial areas.

[Operation]

An operation of information processing device 210 configured as described above will now be described.

Figure 9:
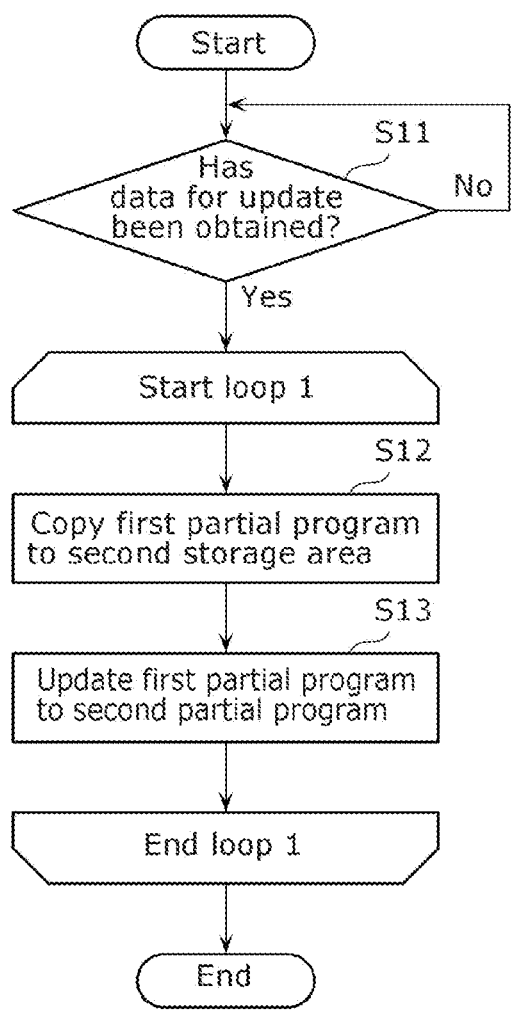
FIG. 9 is a flowchart illustrating an example of an updating process performed by an information processing device according to an embodiment.
Figure 10:
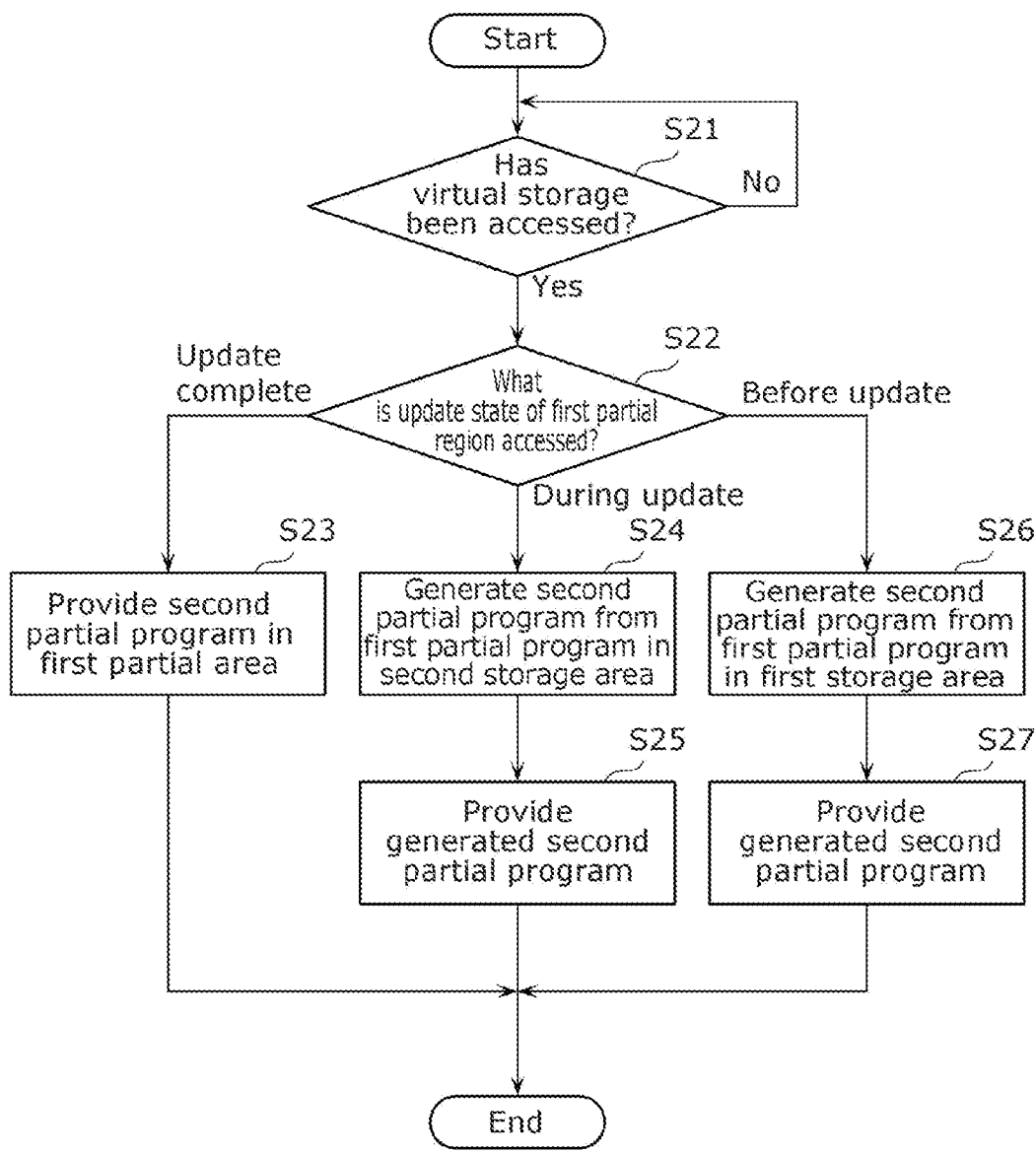
FIG. 10 is a flowchart illustrating an example of an providing process performed by an information processing device according to an embodiment.

First, the updating process will be described. FIG. 9 is a flowchart illustrating an example of an updating process performed by information processing device 210 according to an embodiment.

Managing ECU 220 determines whether managing ECU 220 has obtained data for an update (S11).

If managing ECU 220 has determined that managing ECU 220 has obtained the data for an update (Yes at S11), managing ECU 220 performs loop 1 including step S12 and step S13 described below for each of the plurality of first partial areas 251 to 255. Meanwhile, if managing ECU 220 has determined that managing ECU 220 has not obtained the data for an update (No at S11), the process returns to step S11.

Managing ECU 220 copies a first partial program stored in a first partial area to be processed to second storage area 242 (S12).

Managing ECU 220 updates the first partial program stored in the first partial area to be processed to a second partial program by use of partial data, of the data for an update, that corresponds to this first partial program (S13).

Managing ECU 220 executes step S12 and step S13 for each of first partial areas 251 to 255 and then terminates the process. Next, the providing process will be described. FIG.

10 is a flowchart illustrating an example of a providing process performed by information processing device 210 according to an embodiment.

Managing ECU 220 determines whether ECU 230 has accessed virtual storage 260 (S21).

If managing ECU 220 has determined that ECU 230 has accessed virtual storage 260 (Yes at S21), managing ECU 220 determines the update state of the first partial area that has been accessed (S22). If managing ECU 220 has determined that ECU 230 has not accessed virtual storage 260 (No at S21), the process returns to step S21.

If the update state of the first partial area that has been accessed indicates that the updating process has been performed (the update has been completed) (Update complete at S22), managing ECU 220 performs step S23. If the update state of the first partial area that has been accessed indicates that the first partial area is presently being updated (During update at S22), managing ECU 220 performs step S24. If the update state of the first partial area that has been accessed indicates that the first partial area has not yet been updated (the update has not been performed) (Before update at S22), managing ECU 220 performs step S26.

At step S23, managing ECU 220 provides ECU 230 with the second partial program stored in the first partial area that has been accessed (S23).

At step S24, managing ECU 220 generates a second partial program by use of a first partial program stored in second storage area 242 and the difference data corresponding to this first partial program (S24). Then, managing ECU 220 provides the generated second partial program to ECU 230 (S25).

Figure 11:
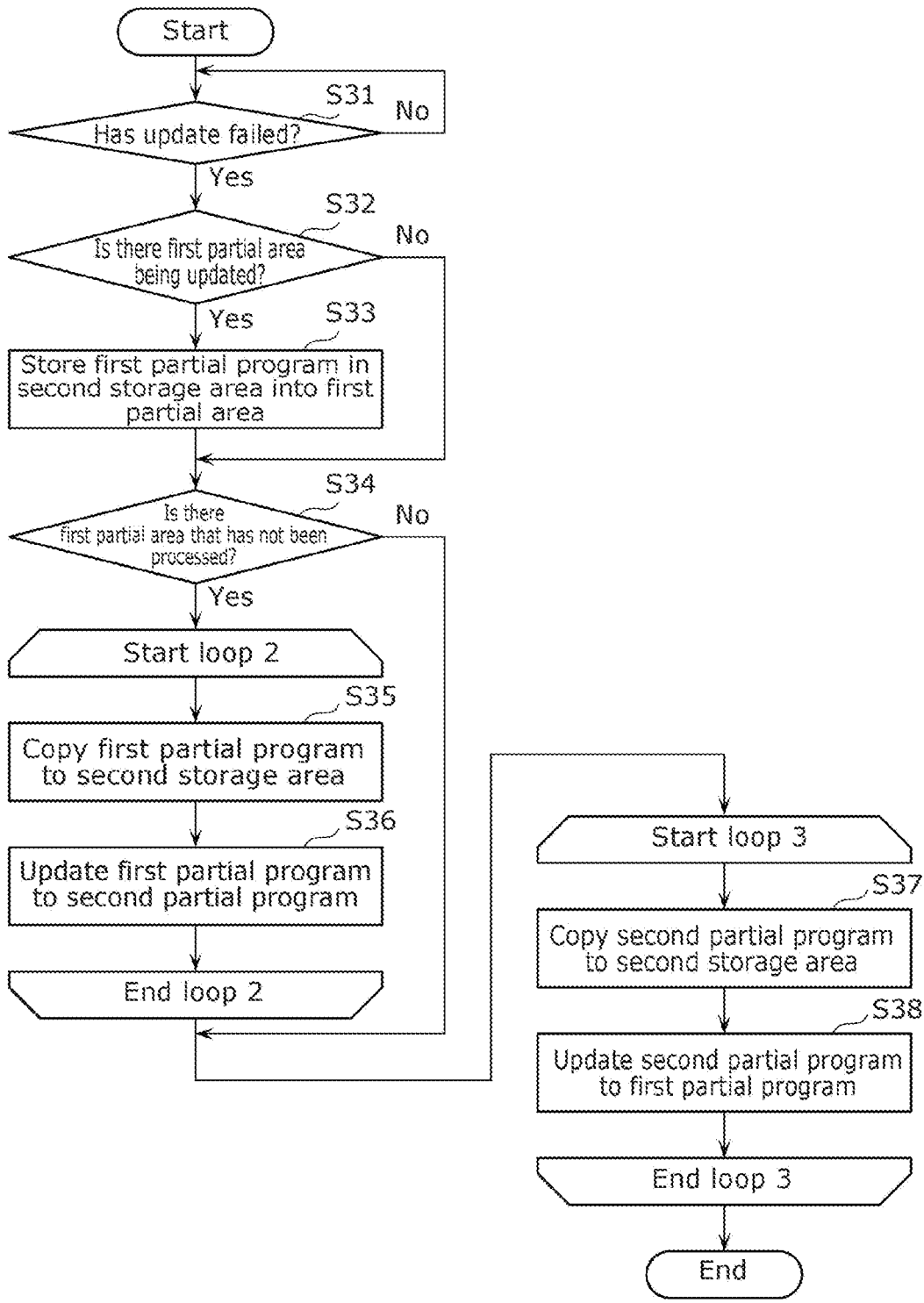
FIG. 11 is a flowchart illustrating a first example of a rollback process performed by an information processing device according to an embodiment.

At step S26, managing ECU 220 generates a second partial program by use of a first partial program stored in the first partial area that has been accessed and the difference data corresponding to this first partial program (S26). Then, managing ECU 220 provides the generated second partial program to ECU 230 (S27). Next, a first example of a process (a rollback process) of restoring to a pre-update state when the updating process has failed will be described. FIG. 11 is a flowchart illustrating a first example of a rollback process performed by information processing device 210 according to an embodiment.

Managing ECU 220 determines whether the update has failed during the updating process (S31). For example, managing ECU 220 determines that the update has failed in the process at step S31, for example but not limited to, if the data for an update becomes damaged, if a non-writable area arises due to a physical deterioration or the like of storage 240, or if an anomalous interruption occurs during the updating process. Managing ECU 220 can determine that the data for an update has become damaged, for example, if managing ECU 220 has failed to obtain the data for an update from storage 240 or if managing ECU 220 has failed to apply the data for an update to the updating process. Managing ECU 220 can determine that a non-writable area has arisen due to a physical deterioration or the like of storage 240, for example, if an error is detected during the updating process. Managing ECU 220 can determine that an anomalous interruption has occurred during the updating process, for example, if an error is detected during the updating process or if the program content that has been written after the updating process has resumed is confirmed.

In this example, managing ECU 220 may fail to update in the following cases, for example. The cases where managing ECU 220 may fail to update include, for example, a case where an unexpected power shutoff occurs while the data for an update is being received, a case where a non-writable area arises due to a physical deterioration or the like of storage 23, a case where a pre-error check access occurs to a non-writable area, or a case where the processing load exceeds a predetermined load.

If managing ECU 220 has determined that the update has failed during the updating process described with reference to FIG. 9 (Yes at S31), managing ECU 220 determines whether there is a first partial area that is in the updating process (S32). Meanwhile, if managing ECU 220 has determined that the update has not failed during the updating process (No at S31), the process returns to step S31. In this case, the updating process described with reference to FIG. 9 is continued.

If managing ECU 220 has determined that there is a first partial area that is in the updating process (Yes at S32), managing ECU 220 stores the first partial program stored in second storage area 242 into the first partial area that is in the updating process (S33). If a write failure or the like into the area being updated has occurred, there is a possibility that it is unable to determine whether the data present in the first partial area has not been updated or has been updated or that the data is damaged. Therefore, performing the process at step S32 and step S33 makes it possible to roll back the area being updated reliably to the first partial program, and the processes that follow can be performed reliably.

If managing ECU 220 has determined that there is no first partial area that is in the updating process (No at S32) or after managing ECU 220 has performed step S33, managing ECU 220 determines whether there is a first partial area that has not be subjected to the updating process (the process has not been performed) (S34).

If managing ECU 220 has determined that there is a first partial area that has not been subjected to the updating process (Yes at S34), managing ECU 220 performs loop 2 including step S35 and step S36 described below for each of the first partial areas that have not been subjected to the updating process.

Managing ECU 220 copies the first partial program stored in the first partial area to be processed to second storage area 242 (S35).

Managing ECU 220 updates the first partial program stored in the first partial area to be processed to a second partial program by use of partial data, of the data for an update, that corresponds to the stated first partial program (S36).

If managing ECU 220 has determined that there is no first partial area that has not been subjected to the updating process (No at S34) or if step S35 and step S36 have been executed on all of the first partial areas that have not been subjected to the updating process, managing ECU 220 performs loop 3 including step S37 and step S38 for each of all first partial areas 251 to 255 that have been subjected to the updating process.

Managing ECU 220 copies the second partial program stored in the first partial area to be processed to second storage area 242 (S37).

Managing ECU 220 updates the second partial program stored in the first partial area to be processed to a first partial program by use of partial data, of the data for an update, that corresponds to the stated second partial program (S38).

Managing ECU 220 executes step S37 and step S38 for each of first partial areas 251 to 255 and then terminates the process.

With this process, even when the update from the first program to the second program has failed during the updating process, the state in which the first program is stored in first storage area 241 can be restored.

Figure 12:
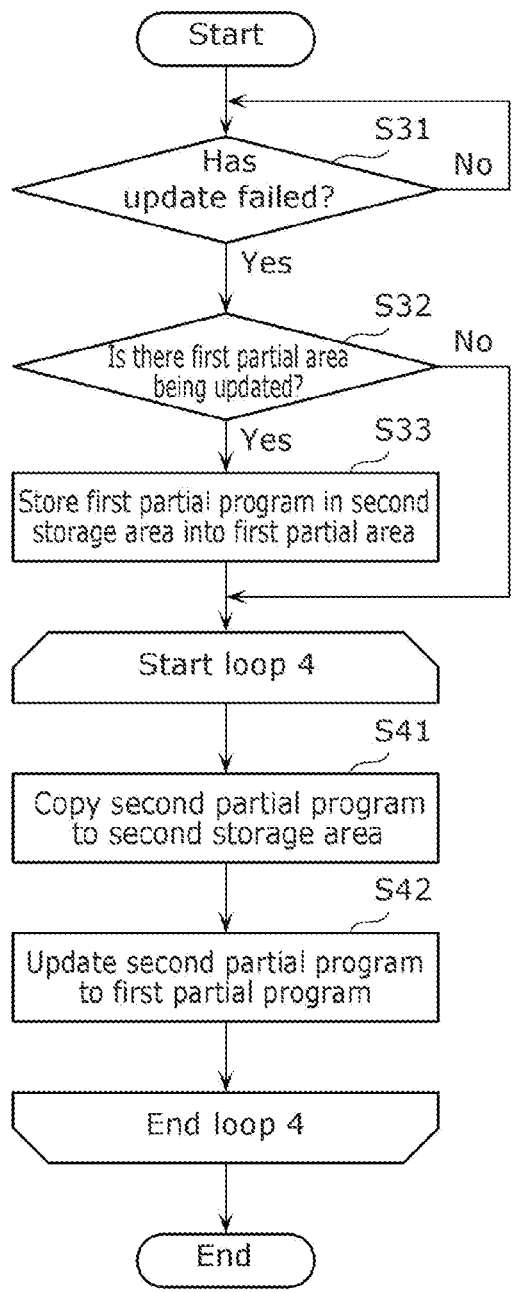
FIG. 12 is a flowchart illustrating a second example of a rollback process performed by an information processing device according to an embodiment.

Next, a second example of a process (a rollback process) of restoring to a pre-update state when the updating process has failed will be described. FIG. 12 is a flowchart illustrating a second example of a rollback process performed by information processing device 210 according to an embodiment.

Managing ECU 220 performs the processes that are identical to the processes at step S31 to step S33.

If managing ECU 220 has determined that there is no first partial area that is in the updating process (No at S32) or after step S33, managing ECU 220 performs loop 4 including step S41 and step S42 described below for each of the one or more first partial areas that have been updated and any first partial area where the update has failed.

Managing ECU 220 copies the second partial program stored in the first partial area to be processed to second storage area 242 (S41).

Managing ECU 220 updates the second partial program stored in the second partial area to be processed to a first partial program by use of partial data, of the data for an update, that corresponds to this second partial program (S42).

Managing ECU 220 executes step S41 and step S42 for all the first partial areas that have been updated and any first partial area where the update has failed and then terminates the process.

With this process, even when the update from the first program to the second program has failed during the updating process, the state in which the first program is stored in first storage area 241 can be restored.

Figure 13:
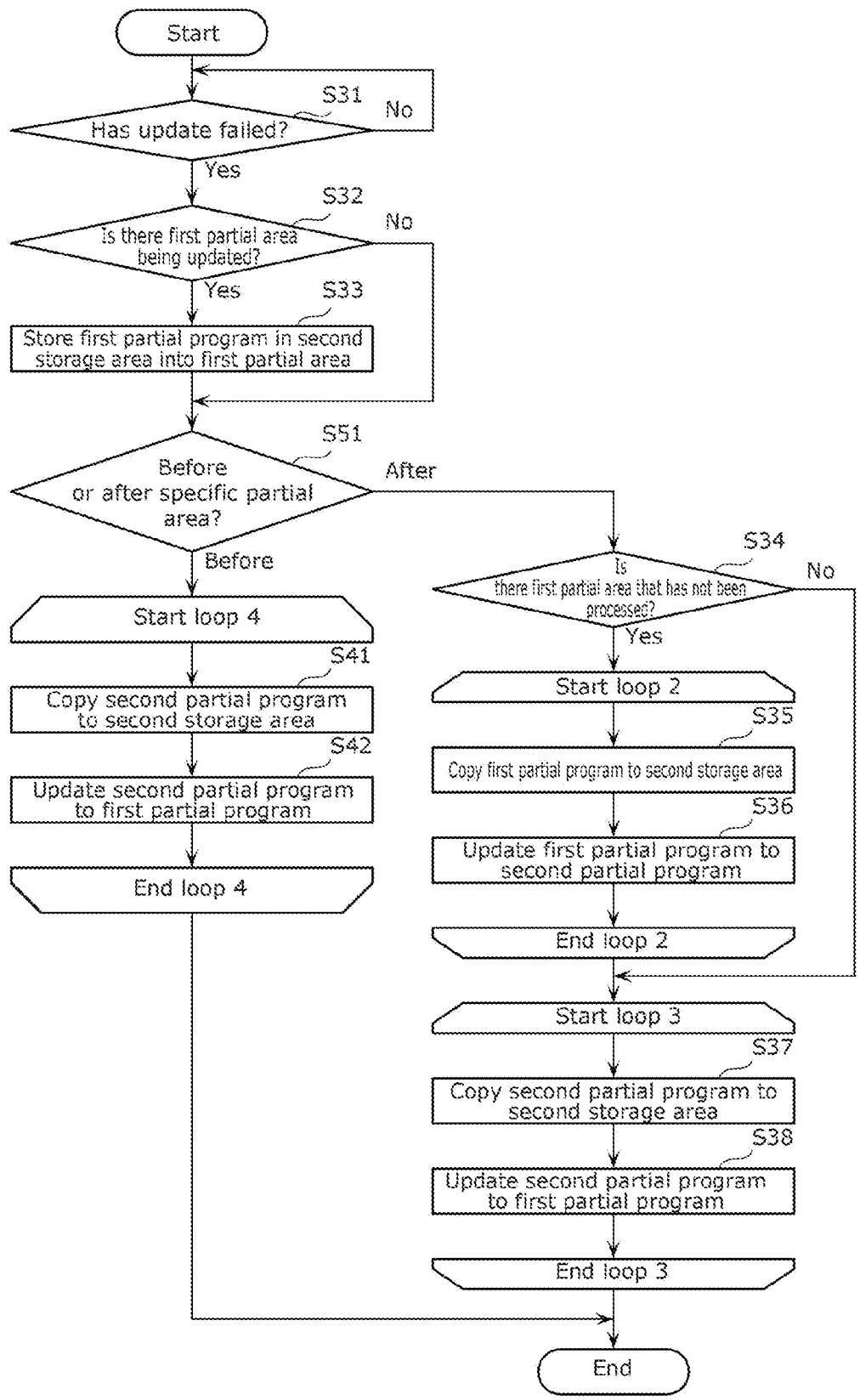
FIG. 13 is a flowchart illustrating a third example of a rollback process performed by an information processing device according to an embodiment.

Next, a third example of a process (a rollback process) of restoring to a pre-update state when the updating process has failed will be described. FIG. 13 is a flowchart illustrating a third example of a rollback process performed by information processing device 210 according to an embodiment.

Managing ECU 220 performs the processes that are identical to the processes at step S31 to step S33.

If managing ECU 220 has determined that there is no first partial area that is in the updating process (No at S32) or after step S33, managing ECU 220 determines whether the first partial area where the update has failed comes before or after specific first partial area 253 of the plurality of first partial areas 251 to 255 in terms of their processing order (S51).

If managing ECU 220 has determined that the first partial area where the update has failed comes before specific first partial area 253 of the plurality of first partial areas 251 to 255 in terms of their processing order (Before at S51), managing ECU 220 performs loop 4 including step S41 and step S42 described below for each of the one or more first partial areas that have been updated and any first partial area where the update has failed. Loop 4 has been described above with reference to FIG. 12, and thus descriptions thereof will be omitted.

If managing ECU 220 has determined that the first partial area where the update has failed comes after specific first partial area 253 of the plurality of first partial areas 251 to 255 in terms of their processing order (After at S51), managing ECU 220 performs the processes identical to the processes at step S34 to step S38.

With this process, even when the update from the first program to the second program has failed during the updating process, the process can be modified in accordance with the location of the first partial area where the update has failed, and thus the time required for the process can be reduced.

Advantageous Effects and Others

With information processing device 210 according to the present embodiment, a first partial program stored in a first partial area to be subjected to an updating process is copied to second storage area 242 to relocate the first partial program, and then the first partial program stored in this first partial area is updated to a second partial program. Therefore, even in a case where the first partial area is accessed during the updating process, the relocated first partial program can be used instead of the first partial program that is in the updating process, and the program can be provided to the accessing device. Moreover, the data used for an update is difference information, and the program to be relocated is a first partial program, or a part of the first program. Therefore, the amount of data used in the storage when updating the program can be reduced.

In addition, information processing device 210 according to the present embodiment includes ECU 230 and managing ECU 220 that includes update controller 221 and provider 222 that provides ECU 230 with storage 240 as virtual storage 260, and the first program is a program to be executed when ECU 230 starts. In other words, the first program that ECU 230 executes is stored in virtual storage 260 provided by managing ECU 220, and the program for ECU 230 can be updated without involving ECU 230. Therefore, the program for ECU 230 to be updated can be updated without affecting an operation of ECU 230.

In addition, in information processing device 210 according to the present embodiment, the difference information includes items of difference data indicating a difference or differences between a plurality of first data units constituting the first program and a plurality of second data units constituting the second program. The difference information also includes correspondence relationship information for identifying a first data unit and a second data unit that correspond to the stated difference data for each of the items of difference data. Therefore, a first data unit to which the difference data is to be applied can be identified with ease. Accordingly, the processing load related to the process of generating the second partial program and the processing time related to this generating process can be reduced.

[Variations]

[Variation 1]

According to the foregoing embodiment, managing ECU 220 and ECU 230 are each implemented by any one of n ECUs 22, but this is not a limiting example. Alternatively, managing ECU 220 and ECU 230 may each be implemented by one or more processors and a memory or a storage storing a program for implementing a virtualization environment.

Figure 14:
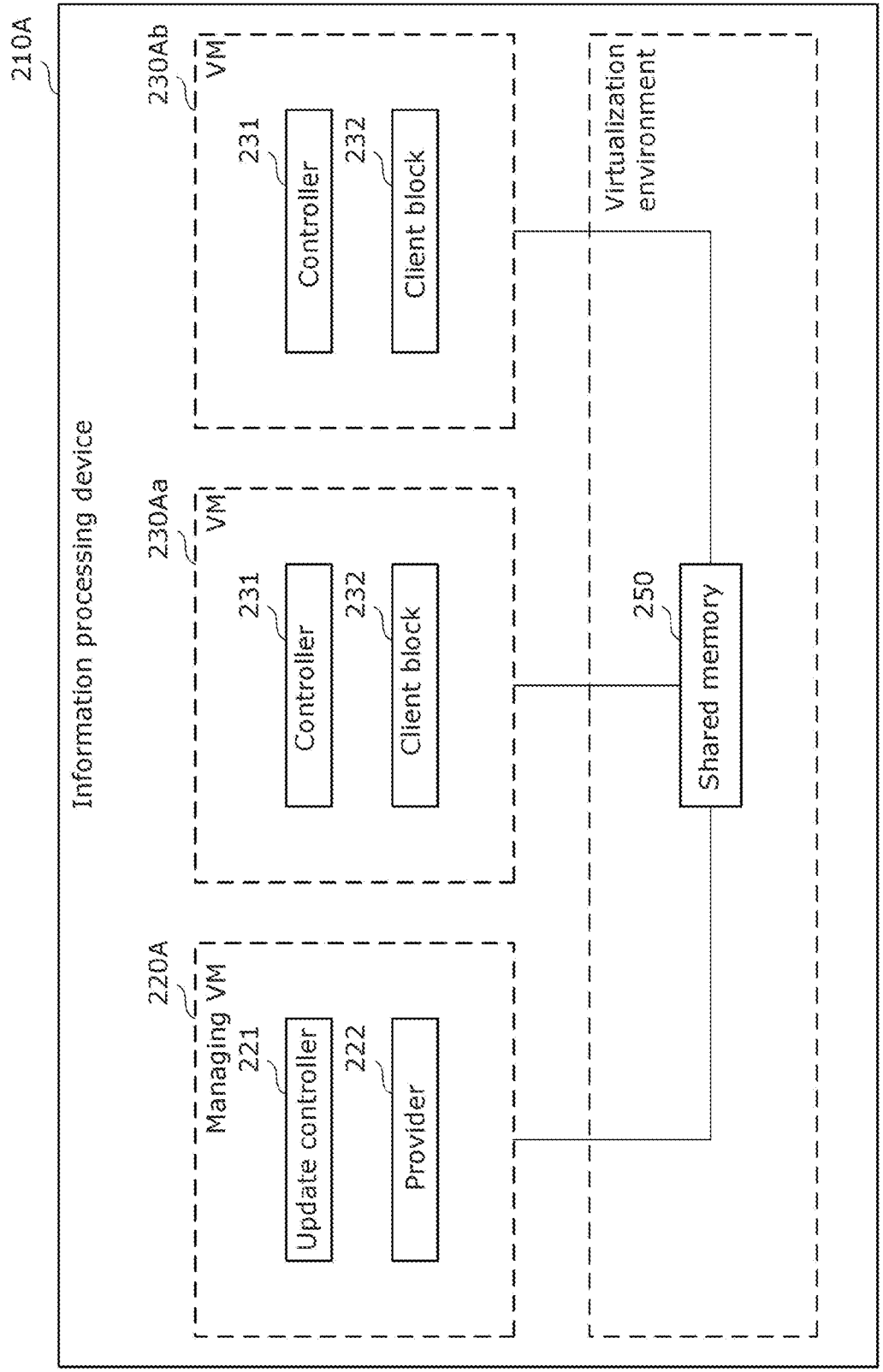
FIG. 14 is a block diagram illustrating an example of a functional configuration of an information processing device according to Variation 1.
Figure 15:
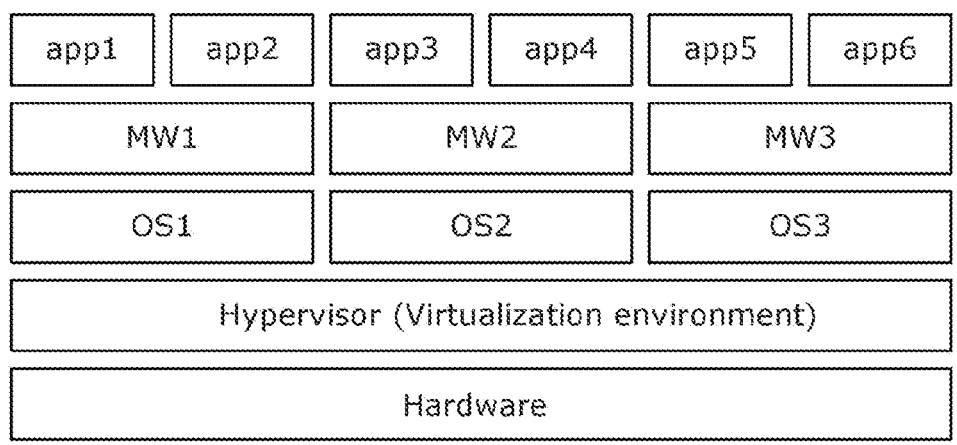
FIG. 15 is a diagram illustrating a configuration of a virtual machine that implements functions of an information processing device according to Variation 1.

FIG. 14 is a block diagram illustrating an example of a functional configuration of information processing device 210A according to Variation 1. FIG. 15 is a diagram illustrating a configuration of a virtual machine that implements the functions of information processing device 210A according to Variation 1.

As illustrated in FIG. 14, information processing device 210A includes managing virtual machine (VM) 220A, a plurality of virtual machines (VMs) 230Aa and 230Ab, and shared memory 250. As illustrated in FIG. 15, information processing device 210A includes a virtual machine implemented virtually by software on one or more hardware devices. For example, information processing device 210A is implemented by a hypervisor virtualization environment. Managing VM 220A is equipped with functions similar to the functions of managing ECU 220 according to the embodiment. The plurality of VMs 230Aa and 230Ab are each equipped with functions similar to the functions of ECU 230 according to the embodiment.

Shared memory 250 provides a storage area via a virtual storage function. In this manner, the storage area of the program for each VM is implemented by shared memory 250, and thus information can be exchanged between managing VM 220A and VMs 230Aa and 230Ab at a high speed.

[Variation 2]

According to the foregoing embodiment, automobile 200 serves as an example of the mobile body. The mobile body, however, is not limited to automobile 200 and may be any other means of transportation, an unmanned vehicle, or a flying body such as a drone. Moreover, information processing device 210 is not limited to a computer system provided in the mobile body, for example, and may be applied to any computer system that includes a plurality of controllers.

[Others]

In the foregoing embodiment and Variations 1 and 2 thereof, the constituent elements may each be implemented by dedicated hardware or may each be implemented through the execution of a software program suitable for the corresponding constituent element. The constituent elements may each be implemented as a program executing unit, such as a CPU or a processor, reads out a software program recorded on a recording medium, such as a hard disk or a semiconductor memory, and executes the software program. Here, software that implements the program updating method and so on according to the embodiment described above is a program such as the one described below.

Specifically, this program causes a computer to execute an information processing method to be executed by an information processing device that includes a storage in which a first program is stored, and the information processing method includes obtaining data for updating the first program from an external device and updating the first program to a second program by use of the data obtained. The updating includes, for each of a plurality of first partial areas obtained by dividing a first storage area that is a storage area of the storage in which the first program is stored, copying a first partial program that is a part of the first program and that is stored in the first partial area to a second storage area different from the first storage area and then successively updating the first partial program to a second partial program that is a part of the second program by use of partial data of the data, the partial data corresponding to the first partial program. The data is difference information indicating a difference between the first program and the second program. The second storage area has a storage capacity smaller than a storage capacity of the first storage area.

Thus far, an embodiment has been described to illustrate the techniques according to the present disclosure. The appended drawings and the detailed description are provided for that purpose.

Therefore, the constituent elements illustrated in the appended drawings and the detailed description may include not only the constituent elements that are essential for solving the problem but also constituent elements that are for illustrating the technique and are not essential for solving the problem. Hence, that these components that are not essential are illustrated in the appended drawings and the detailed description should not immediately give any authorization that these non-essential components are to be considered to be essential.

Since the foregoing embodiment is merely for illustrating the techniques according to the present disclosure, various modifications, substitutions, additions, omissions, and so on can be made within the scope of the claims and equivalents thereof.

Further Information about Technical Background to this Application

The disclosures of the following patent applications including specification, drawings, and claims are incorporated herein by reference in their entirety: Japanese Patent Application No. 2020-014785 filed on Jan. 31, 2020, and PCT International Application No. PCT/JP2021/000757 filed on Jan. 13, 2021.

INDUSTRIAL APPLICABILITY

The present disclosure can be applied to an information processing device and so on that can update a program for a controller to be updated without affecting this controller.

The invention claimed is:
1. An information processing device comprising:
a first controller, including at least one processor;
a storage in which a first program is stored, the first program being a program executed when the first controller starts; and
a second controller, including at least one processor different from the at least one processor included in the first controller, that provides the first controller with the storage as a virtual storage, obtains data for updating the first program from an external device and updates the first program to a second program by use of the data obtained, wherein
for each of a plurality of first partial areas obtained by dividing a first storage area that is a storage area of the storage in which the first program is stored, the second controller copies a first partial program that is a part of the first program and that is stored in the first partial area to a second storage area different from the first storage area, and then successively updates the first partial program to a second partial program that is a part of the second program by use of partial data of the data, the partial data corresponding to the first partial program,
the data is difference information indicating a difference between the first program and the second program,
the second storage area has a storage capacity smaller than a storage capacity of the first storage area, and
when the first controller has accessed the virtual storage while the second controller is updating the first program,
(i) when an area accessed by the first controller is a first partial area included in the plurality of first partial areas that has been subjected to an updating process, the second controller provides the first controller with the second partial program stored in the first partial area,
(ii) when the area accessed is a first partial area that is being subjected to the updating process, the second controller generates a second partial program updated from a first partial program stored in the second storage area by use of the first partial program and partial data of the data, the partial data corresponding to the first partial program, and provides the first controller with the second partial program generated, and

(iii) when the area accessed is a first partial area that has not been subjected to the updating process, the second controller generates a second partial program updated from a first partial program stored in the first storage area by use of the first partial program and partial data of the data, the partial data corresponding to the first partial program, and provides the first controller with the second partial program generated.

2. The information processing device according to claim 1, wherein
the difference information includes:
items of difference data indicating a difference between a plurality of first data units constituting the first program and a plurality of second data units constituting the second program; and
correspondence relationship information for identifying, for each of the items of difference data, one first data unit, among the plurality of first data units, and one second data unit, among the plurality of second data units, the one first data unit and the one second data unit corresponding to the difference data.

3. The information processing device according to claim 1, wherein
when an update has failed while the second controller is updating the first program,
for each of the plurality of first partial areas, the second controller updates the first partial program stored in the first partial area to the second partial program, and
for each of the plurality of first partial areas obtained by dividing the first storage area storing the second program, the second controller, after updating the first program to the second program, copies the second partial program that is a part of the second program and that is stored in the first partial area to the second storage area, and then updates the second partial program to the first partial program that is a part of the first program by use of partial data of the data, the partial data corresponding to the second partial program.

4. The information processing device according to claim 1, wherein
when an update has failed while the second controller is updating the first program, for each of one or more of the plurality of first partial areas that have been updated and the first partial area where the update has failed, the second controller copies a second partial program that is a part of the second program and that is stored in the first partial area to the second storage area, and then updates the second partial program to the first partial program by use of partial data of the data, the partial data corresponding to the second partial program.

5. The information processing device according to claim 1, wherein
when an update has failed while the second controller is updating the first program, the second controller makes a determination as to whether a first partial area where the update has failed comes before or after a specific first partial area of the plurality of first partial areas in terms of a processing order,
when a result of the determination indicates that the first partial area where the update has failed comes before the specific first partial area in terms of the processing order, for each of the plurality of first partial areas that have been updated and the first partial area where the update has failed, the second controller copies a second partial program that is a part of the second program and that is stored in the first partial area to the second storage area, and then updates the second partial program to the first partial program by use of partial data of the data, the partial data corresponding to the second partial program, and
when the result of the determination indicates that the first partial area where the update has failed comes after the specific first partial area in terms of the processing order,
for each of the plurality of first partial areas, the update second controller updates the first partial program stored in the first partial area to the second partial program, and
for each of a plurality of second partial areas obtained by dividing a third storage area storing the second program, the second controller, after updating the first program to the second program, copies a third partial program that is a part of the second program and that is stored in the second partial area to the second storage area, and then updates the third partial program to a fourth partial program that is a part of the first program by use of partial data of the data, the partial data corresponding to the third partial program.

6. An information processing method to be executed by a processor of an information processing device, the information processing device including the processor and an other processor which is different from the processor, and a storage in which a first program is stored, the information processing method comprising:
providing the other processor with the storage as a virtual storage;
obtaining data for updating the first program from an external device, the first program being a program executed when the other processor starts; and
updating the first program to a second program by use of the data obtained, wherein
the updating includes, for each of a plurality of first partial areas obtained by dividing a first storage area that is a storage area of the storage in which the first program is stored, copying a first partial program that is a part of the first program stored in the first partial area to a second storage area different from the first storage area and then successively updating the first partial program to a second partial program that is a part of the second program by use of partial data of the data, the partial data corresponding to the first partial program,
the data is difference information indicating a difference between the first program and the second program,
the second storage area has a storage capacity smaller than a storage capacity of the first storage area, and
the method further includes, when the other processor has accessed the virtual storage while updating the first program,
(i) when an area accessed by the other processor is a first partial area included in the plurality of first partial areas that has been subjected to an updating process, providing the other processor with the second partial program stored in the first partial area,
(ii) when the area accessed is a first partial area that is being subjected to the updating process, generating a second partial program updated from a first partial program stored in the second storage area by use of the first partial program and partial data of the data, the partial data corresponding to the first partial program, and providing the other controller with the second partial program generated, and (iii) when the area accessed is a first partial area that has not been subjected to the updating process, generating a second partial program updated from a first partial program stored in the first storage area by use of the first partial program and partial data of the data, the partial data corresponding to the first partial program, and providing the other processor with the second partial program generated.

\* \* \* \* \*